(12) United States Patent
Dedul et al.

(10) Patent No.: US 11,400,393 B2
(45) Date of Patent: Aug. 2, 2022

(54) FILTRATION SYSTEM

(71) Applicant: MAAGAN FILTRATION ACA LTD., Kibbutz Ma'agan Michael (IL)

(72) Inventors: Kirill Dedul, Haifa (IL); Oded Elish, Qiryat Tivon (IL)

(73) Assignee: MAAGAN FILTRATION ACA LTD., Kibbutz Ma'agan (IL)

(*) Notice: Subject to any disclaimer, the term of this patent is extended or adjusted under 35 U.S.C. 154(b) by 0 days.

(21) Appl. No.: 16/767,730

(22) PCT Filed: Nov. 29, 2018

(86) PCT No.: PCT/IL2018/051310
§ 371 (c)(1),
(2) Date: May 28, 2020

(87) PCT Pub. No.: WO2019/106673
PCT Pub. Date: Jun. 6, 2019

(65) Prior Publication Data
US 2021/0046407 A1 Feb. 18, 2021

Related U.S. Application Data
(60) Provisional application No. 62/591,941, filed on Nov. 29, 2017.

(51) Int. Cl.
*B01D 29/41* (2006.01)
*B01D 29/64* (2006.01)

(52) U.S. Cl.
CPC ......... *B01D 29/41* (2013.01); *B01D 29/6446* (2013.01)

(58) Field of Classification Search
None
See application file for complete search history.

(56) References Cited

U.S. PATENT DOCUMENTS

| 3,426,907 A | 2/1969 | Stone |
| 3,754,659 A | 8/1973 | Krynski et al. |

(Continued)

FOREIGN PATENT DOCUMENTS

| CN | 1128501 A | 8/1996 |
| CN | 202538463 U | 11/2012 |

(Continued)

OTHER PUBLICATIONS

PCT Search Report for International Application No. PCT/IL2018/051310 dated Mar. 14, 2019, 4 pp.

(Continued)

*Primary Examiner* — Robert J Popovics
(74) *Attorney, Agent, or Firm* — The Roy Gross Law Firm, LLC; Roy Gross (57) ABSTRACT

A filter for filtering liquid, comprising: a cylindrical housing; and a multiplicity of discs positioned perpendicularly to a height of the cylindrical housing, each of the multiplicity of discs comprised of a first number of cassettes, wherein each cassette is shaped as a truncated sector having a wide end and a narrow end, the cassettes arranged such that a perimeter of the disc is formed by the wide end of the first number of cassettes, and wherein each of the first number of cassettes is connected to a housing at its wide end, and each cassette having an opening along the wide end, wherein during filtration, liquid being filtered flows over the multiplicity of discs towards the perimeter of the multiplicity of discs.

13 Claims, 14 Drawing Sheets

(56) References Cited

U.S. PATENT DOCUMENTS

| | | | |
|---|---|---|---|
| 5,679,249 A | 10/1997 | Fendya et al. | |
| 5,900,158 A | 5/1999 | Ruokolainen et al. | |
| 11,000,791 B2 * | 5/2021 | Jibert et al. | B01D 33/21 |
| 2010/0032388 A1 | 2/2010 | Ralvert | |
| 2013/0186820 A1 | 7/2013 | Tal | |
| 2013/0299408 A1 | 11/2013 | Olenberg et al. | |
| 2015/0122723 A1 | 5/2015 | Orlans | |
| 2015/0265951 A1 | 9/2015 | Frommann et al. | |
| 2016/0263497 A1 | 9/2016 | Giasson et al. | |
| 2021/0046407 A1 * | 2/2021 | Dedul | B01D 25/26 |

FOREIGN PATENT DOCUMENTS

| | | |
|---|---|---|
| CN | 103328066 A | 9/2013 |
| CN | 204395596 U | 6/2015 |
| DE | 2647022 A1 | 4/1978 |
| GB | 1361054 A | 7/1974 |
| WO | 2007128475 A1 | 11/2007 |
| WO | 2016030903 A1 | 3/2016 |
| WO | 2018178965 A1 | 10/2018 |
| WO | 2021111200 A1 | 6/2021 |

OTHER PUBLICATIONS

PCT Written Opinion for International Application No. PCT/IL2018/051310 dated Mar. 14, 2019, 5 pp.

PCT Preliminary Report on Patentability for International Application No. PCT/IL2018/051310 dated Jun. 2, 2020, 6 pp.

* cited by examiner

FILTRATION SYSTEM

CROSS-REFERENCE TO RELATED APPLICATIONS

This application is a National Phase of PCT Patent Application No. PCT/IL2018/051310 having International filing date of Nov. 29, 2018, which claims the benefit of priority to U.S. Provisional Patent Application No. 62/591,941, filed Nov. 29, 2017, and entitled "Filtration System". The contents of the above applications are all incorporated by reference as if fully set forth herein in their entirety.

FIELD OF THE INVENTION

The invention relates to the field of filtration systems.

BACKGROUND

A drum-type filter assembly typically includes a drum-like housing, having therein a filtering system comprising one or more substantially round parallel filtering arrays. Each array is substantially shaped as a disc and is comprised of one or more sectors, each of which may be shaped like a segment having a wide end and a truncated corner, thus forming a narrow end. Typically, the sectors are connected at their narrow end to a pipe, or form such pipe, which constitutes the outlet of the filter.

Thus, the liquid flows into the filter from the perimeter of the discs and out through the pipe formed around the center of the filtering discs.

This model suffers from a number of drawbacks including high footprint, i.e. low throughput relatively to the size of the filter assembly. Thus there is a need in the art for an advanced filtering system that overcomes the advantages of prior art systems.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One exemplary embodiment of the disclosed subject matter is a filter for filtering liquid, comprising: a cylindrical housing; and a multiplicity of discs positioned perpendicularly to a height of the cylindrical housing, each of the multiplicity of discs comprised of a first number of cassettes, wherein each cassette is shaped as a truncated sector, having a wide end and a narrow end, the cassettes arranged such that a perimeter of the disc is formed by the wide end of the first number of cassettes, and wherein each of the first number of cassettes is connected to the housing at its wide end, and each cassette having an opening along the wide end, wherein during filtration, liquid being filtered flows over the multiplicity of discs towards the perimeter of the multiplicity of discs.

Within the filter, the multiplicity of discs are optionally static during liquid filtration and during rinsing of the system.

Within the filter, each cassette optionally comprises an opening at its wide end and wherein filtered liquid flows out of the system through the opening.

Within the filter, openings of corresponding cassettes comprised in neighboring discs are optionally connected to form a pipe, thus forming a number of pipes equal to the first number through which the filtered liquid flows out of the system.

Within the filter, each cassette optionally comprises a board having a multiplicity of supports thereon, and each cassette is wrapped by thread forming loops around the cassette.

Within the filter, the liquid to be filtered optionally flows into the cassette and out of the cassette perpendicularly to the discs, and flows within the filter in parallel to the discs.

Within the filter, each cassette optionally comprises a board having a multiplicity of supports thereon, and each cassette is wrapped by thread forming thread loops around the cassette, and wherein the liquid to be filtered flows into the filter and out of the filter perpendicularly to the discs, and flows within the filter in parallel to the discs such that particles to be filtered out get caught between the thread loops.

The filter can further comprise a rinsing system, comprising a multiplicity of nozzles connected to a common pipe, each nozzle located between two adjacent filtering discs.

Within the filter, an end of each of the multiplicity of nozzles is optionally moved over substantially an entire area of the two adjacent filtering layers.

Within the filter, the common pipe is optionally moved by a planetary gear.

Within the filter, the end of each of the multiplicity of nozzles is optionally rotated in a spiral motion over the two adjacent filtering discs.

Within the filter, the spiral motion is optionally created by two motors.

Within the filter, the two motors optionally have different rotation speeds.

Within the filter, the spiral motion is created by two cogwheels rotated at different angular velocities.

Within the filter, the multiplicity of nozzles are optionally moved by a mechanism external to the cylindrical housing.

In addition to the exemplary aspects and embodiments described above, further aspects and embodiments will become apparent by reference to the figures and by study of the following detailed description.

BRIEF DESCRIPTION OF THE FIGURES

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Disclosed herein is filtering system for filtering liquids such as but not limited to water.

Conventional drum-like filtering systems comprise a multiplicity of parallel discs also referred to as arrays, each comprising a number of filtering elements, also referred to as cassettes or sectors. Each cassette is shaped as a sector having a wide end and a truncated corner forming a narrow end. The cassettes are located adjacent to each other along their side edges to form discs, and all cassettes are connected at their truncated ends to a central pipe. The liquid flows into the filter from the perimeter of the drum, over the discs where filtering occurs, and into the central part of the drum and to the pipe through which the filtered liquid is output.

This arrangement has a number of drawbacks.

One such drawback relates to the footprint of the system: the inlet volume is significantly larger than the outlet volume, since the liquid flows over the entire area of each cassette into its narrowest area, thus limiting the outgoing flow of the filter to a fraction of the volume which can be input to the system through the perimeter. The system is thus large relatively to the provided throughput.

Another drawback of such systems is the relative mechanical weakness, caused by the cassettes being connected to the output pipe at their narrowest area.

Yet another drawback of such systems is the complexity of rinsing the discs for removing the collected dirt. Since the cassettes are connected to, or form the pipe at the central part of the drum, a rotating mechanism for rinsing the entire area of the discs cannot be placed at the central area in order to rinse the entire area of the cassettes. Thus, the discs need to be rotated in order to enable rinsing their entire areas, which inhibits fixing the discs to the drum and thus weakens the structure.

The currently disclosed subject matter relates to a drum-like housing, having therein a multiplicity of parallel discs each comprised of cassettes shaped as truncated sectors as described above, wherein the sectors are not connected to a central pipe, thus leaving the central area free. Rather, the cassettes can be connected to the housing of the filter, or to an internal drum by rods passing through the wide end of the truncated sectors. Alternatively, the discs can otherwise be fixed to the housing or to an internal drum.

The liquid is let into the filter in a direction perpendicular to discs and over the entire discs areas. The flow then turns and the liquid is filtered by flowing over the cassettes. The filtered liquid then turn again into pipes formed by elongated openings at the wide end of the multiplicity of cassettes and continue in parallel to the drum, which are in, and from there out of the filter.

The rinsing system can be located within the central area adjacent to the narrow end of the cassettes, and since this area is free, the rinsing system can move freely therein. The rinsing system can comprise a set of nozzles, wherein each nozzle sprays cleansing liquid such as water over one side of one disc and on the opposite side of a neighboring disc.

In some embodiments, the nozzles can be rotated by a two-axis rotating system, thus the nozzle heads can move in a spiral motion and spray cleansing liquid over the whole area of the discs.

In some embodiments, the rinsing system further comprises a second set of multiplicity of nozzles connected to a second common pipe, each nozzle of the second set located between two adjacent filtering discs.

The disclosed filtering system thus has significant advantages over prior art systems. The filtered liquid flows over the entire area of the discs, and out of the filter through of the perimeter of the discs. Thus, the output flow is not limited by the narrowest part of the system, and a smaller footprint is enabled for the same throughput.

Additionally, the structure of the filtering system is more robust than in conventional systems, since the cassettes are connected to the housing by bores, or another structure, on their wide end rather than at their narrow end being directly connected to the pipe. This provides for stronger structure, and is less vulnerable to wear and tear.

Even further, the disc discs are connected to the housing and are thus static during filtration as well as during rinsing of the machine, thus providing for higher durability.

Figure 1:
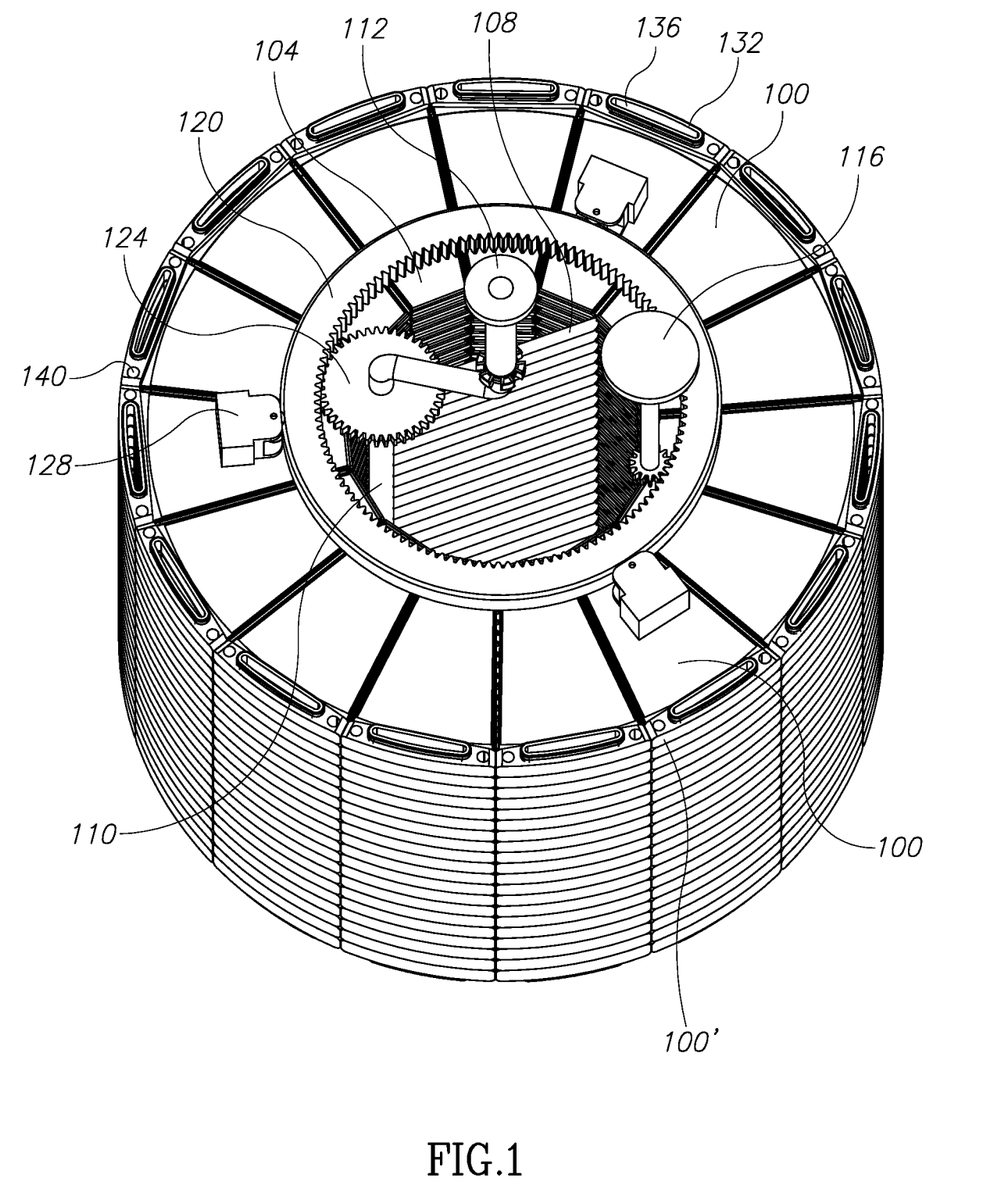
FIG. 1 is an illustration of the internal members of a filter, in accordance with some exemplary embodiments of the subject matter.
Figure 2A:
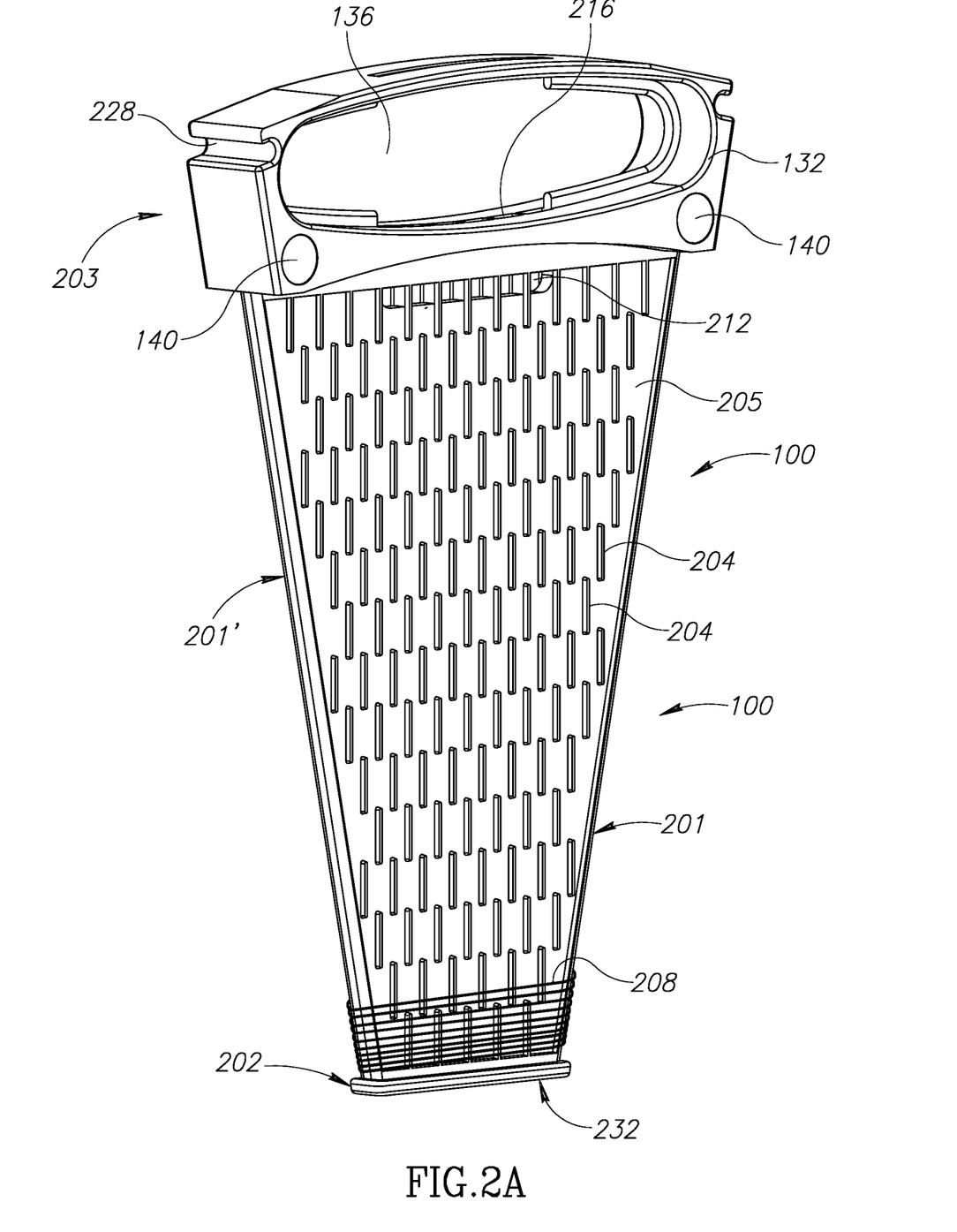
FIG. 2A is an illustration of an individual cassette, in accordance with some exemplary embodiments of the disclosure.

Referring now to FIG. 1, showing an illustration of the internal members of a filter, and to FIG. 2, showing illustration of an individual cassette 100, in accordance with some exemplary embodiments of the subject matter. The filter comprises a multiplicity of disc discs, stacked in parallel to each other. Each disc is made of a multiplicity of cassettes 100 each shaped as a truncated sector. Each cassette 100 thus has a right hand side 201, a left hand side 201', a narrow end 202 and a wide end 203, such that two neighboring cassettes 100 belonging to the same disc have the left hand side edge 201 of one cassette adjacent to the right hand side edge 201' of the neighboring cassette.

Each cassette 100 comprises an opening 136 surrounded by rim 132 on its wide end 203, and two overlapping cassettes 100 belonging to neighboring discs are connected to each other such that openings 136 of all overlapping cassettes 100 form an outlet pipe, as detailed below. Thus, the filtering system comprises pipes outputting filtered liquid in the same number as the number of cassettes in a layer, for example 12, 18 or the like. The length of the pipes is determined in accordance with the height of the cylindrical housing, or the drum containing the discs.

The term "corresponding cassettes" relates to two cassettes belonging to two parallel and adjacent discs, and being positioned in the same position within the respective disc, such as cassettes 100 and 100'. Each pair of corresponding cassettes 100, 100' belonging to neighboring discs can be connected by a connector (not shown) which encircles rims 132 of the two sectors. The connector may be oval or may have another shape. Thus, the sequence of openings 136 forms a pipe through which the filtered liquid flows out of the filter.

The filter can further comprise a rinsing mechanism, comprising a set of multiple nozzles 108 connected to and receiving rinsing liquid from a common pipe 110. Nozzles 108 and pipe 110 constitute a manifold. Each of nozzles 108 may be an elongated tube having an aperture (not shown) near its distal end (the end facing away of pipe 110), for example 0-3 centimeters from the distal end; the aperture may be formed in a side wall of the tube, such that fluid flows out of it perpendicularly to the length of the tube, or at an angle of 45°-135° relative to the length of the tube. Optionally, each of nozzles 108 includes two such apertures facing away from each other in the outer wall of the tube.

In some embodiments, nozzles 108 are rotated by motor 112, which rotates external cogwheel 124, and motor 116 rotating internal cogwheel 120, as detailed below. Internal cogwheel 120 can be attached to a housing of the filter with three or more bearings 128. It will be appreciated, however, that nozzles 108 can be rotated using any other mechanism, such as but not limited to a chain, a belt, friction, or the like.

Referring now to FIG. 2A, each cassette 100 is constructed from a board 205 having supports or protrusions 204 thereon, and wrapped by a thread 208 forming filtration media or filtration substrate. Thread 208 can be made of metal, plastic, fabric, or the like. Supports 204 keep thread 208 from clinging to board 205, thus providing space for the filtered water to flow through. When liquid flows over the cassette, from anywhere on cassette 100 towards wide end 203, the dirt or other particles to be filtered out are caught and remain between the thread loops, while the liquid flows (as illustrated by arrows, such as an arrow 204a) over board 205 and around supports 204. The liquid eventually flows into holes 212 (as illustrated by arrows 212a) and exits through holes 216 (as illustrated by arrows 216a, for example) into opening 136 that form the outlet pipe.

Each cassette 100 further comprises a bore 140 on either side of wide end 203. A rod is inserted through corresponding bores 140 of each stack of cassettes 100 each belonging to a different disc when a filtering system is assembled, such that the discs are kept tight against each other.

Each cassette 100 can comprise a recess 228 on either side of wide end 203. When the filter is assembled, a rail is inserted thorough recesses 228 of corresponding cassettes 100 of all discs, and the ends of the rail connect to the housing or drum of the filter, thus placing the cassettes at their required locations.

The liquid is let through the filtration media in a direction substantially perpendicular to the disc planes and substantially over the entire discs areas. The flow then turns and the liquid flows under and between thread loops 208, such that particles are caught between the thread loops. The filtered liquid then turns again in into the pipes formed by openings 136 and continue in parallel to the height of the drum, and from there out of the filter.

Figure 2B:
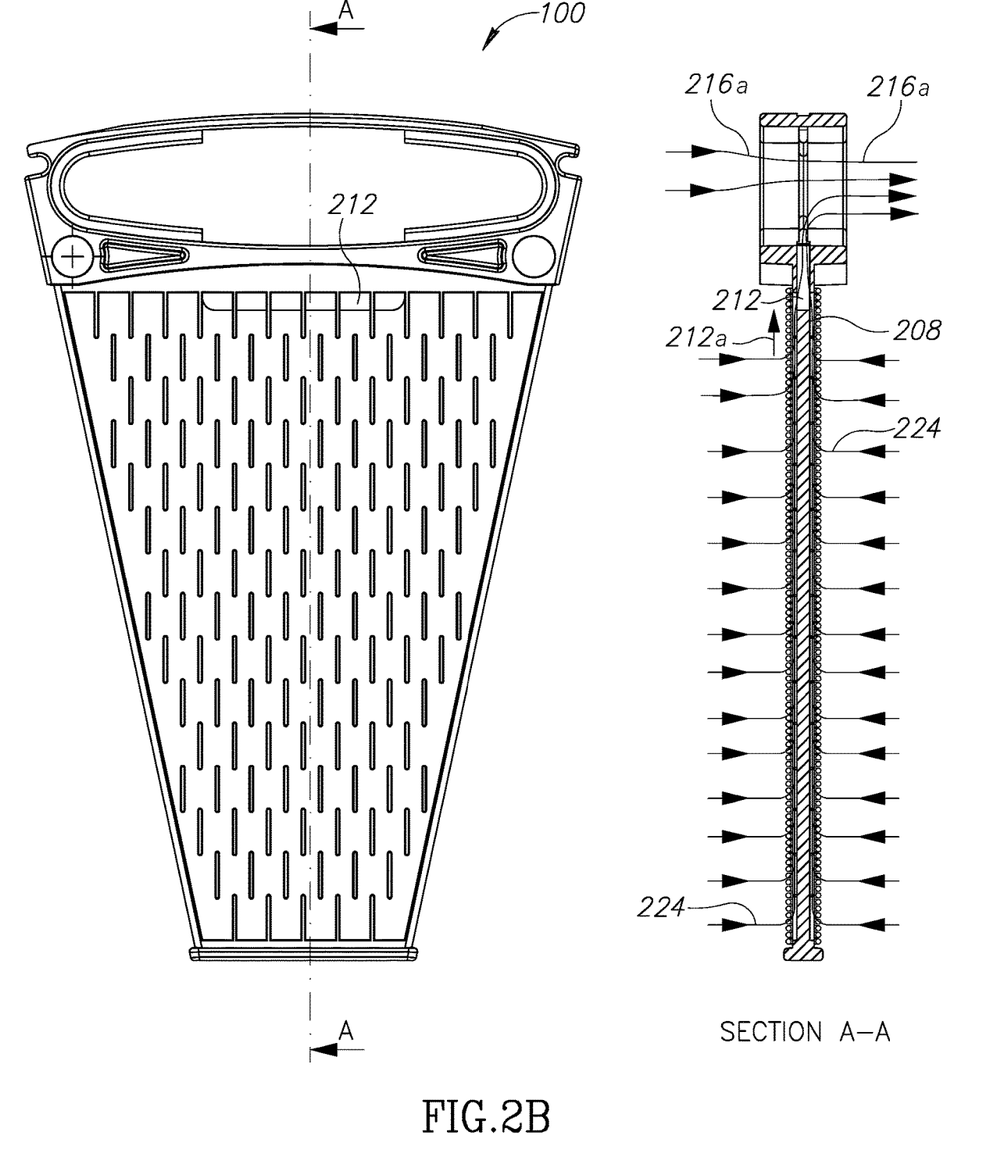
FIG. 2B is an illustration of a cross section of a cassette, and the liquid flow directions, in accordance with some exemplary embodiments of the disclosure.

Referring now to FIG. 2B, showing a cross section of cassette 100, and the liquid flow directions. The liquid reaches cassette 100 at a direction which is substantially orthogonal to the cassette face, and flow over the cassette face between threads 208 towards wide end 203 of the cassette, substantially in parallel to direction 212. At wide end 203, the liquid pours into opening 136, while turning again in substantially orthogonal direction. to assume direction 216.

Figure 2C:
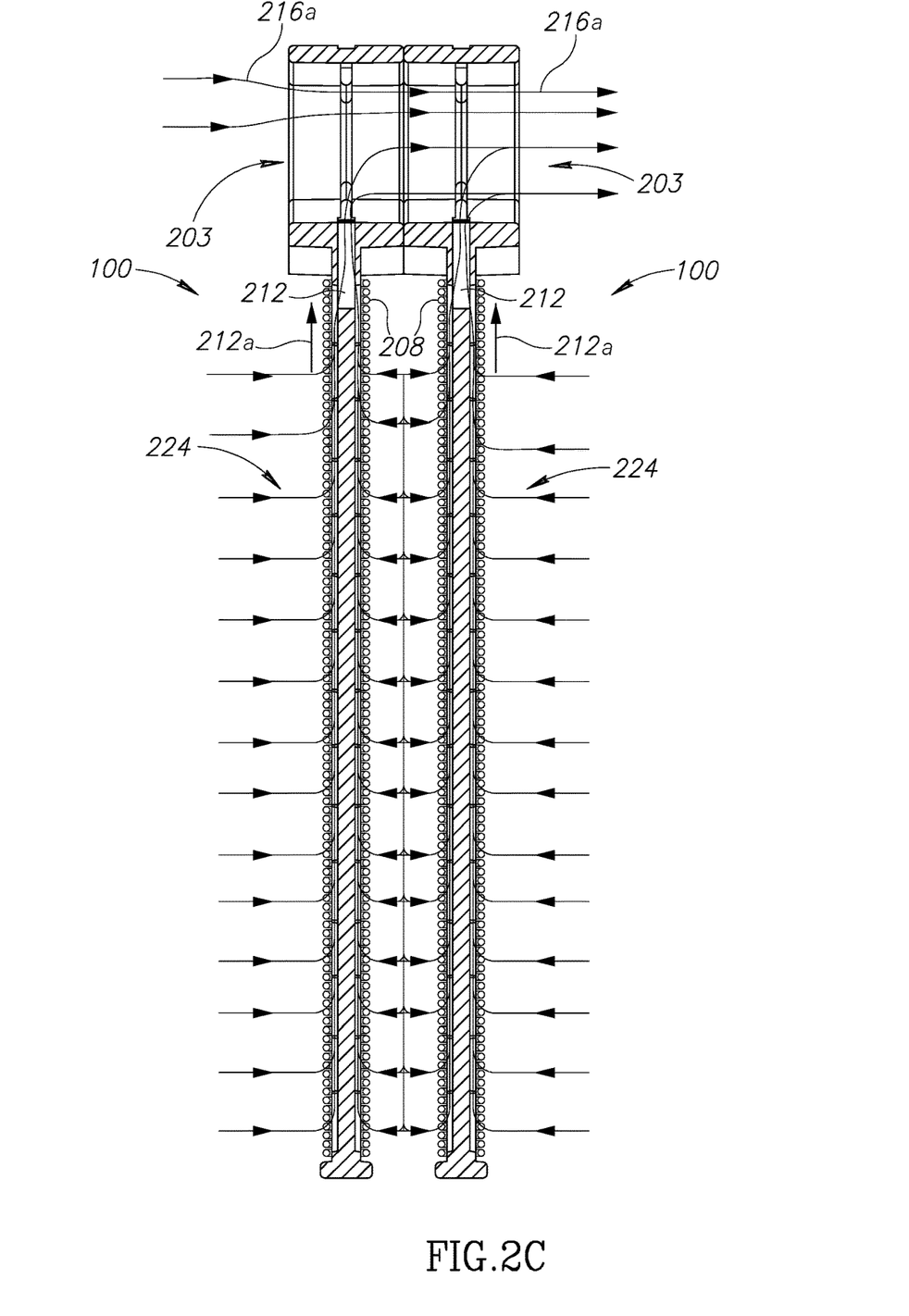
FIG. 2C is an illustration of a two cassettes and liquid flow directions, in accordance with some exemplary embodiments of the disclosure.

Referring now to FIG. 2C, showing the liquid flow over and between two cassettes 100. The liquid reaches cassettes 100 at directions 224 which are substantially orthogonal to the cassette face, and flow over the cassette face between threads 208 towards wide end 203 of the cassettes, substantially in parallel to direction 212. At wide end 203, the liquid pours into openings 136, while turning again in substantially orthogonal direction, to assume direction 216a.

Figure 3:
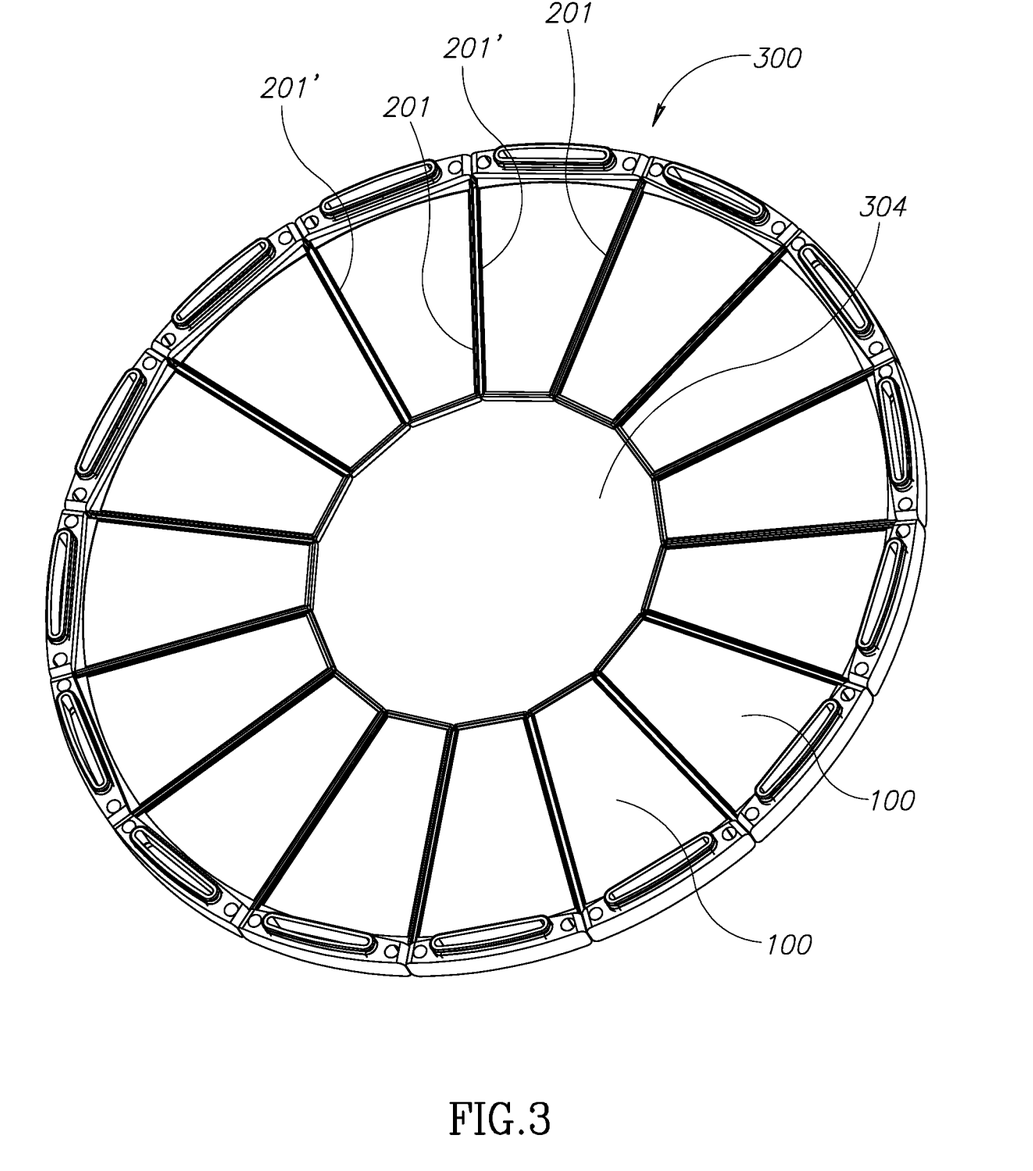
FIG. 3 is an illustration of a disc of a filter, in accordance with some exemplary embodiments of the disclosed subject matter.

Referring now to FIG. 3, showing an illustration of a disc of a filter, in accordance with some exemplary embodiments of the disclosed subject matter. disc 300 is comprised of a multiplicity of cassettes 100 adjacent along sides 201 and 201', thus forming a ring-like array.

Figure 4:
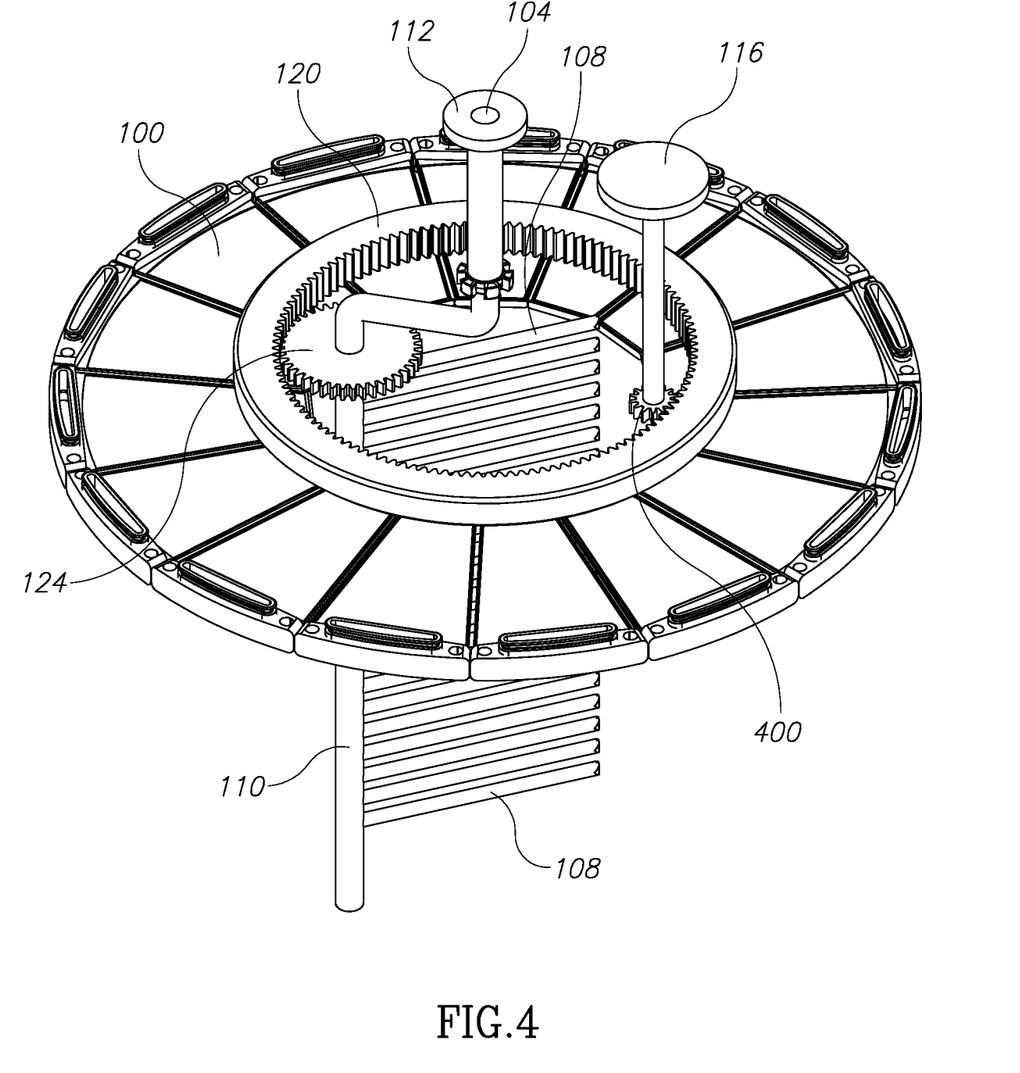
FIG. 4 is an illustration of a disc of a filter with the rinsing mechanism, in accordance with some exemplary embodiments of the disclosed subject matter.

Referring now to FIG. 4, showing an illustration of a disc with the rinsing mechanism, in accordance with some exemplary embodiments of the disclosed subject matter.

Motor 116 rotates cogwheel 400 which in turn rotates external cogwheel 120. Motor 112 turns internal cogwheel 124. The rotation of external cogwheel 120 turns the nozzles around, such that they spray cleansing liquid, such as water, over all cassettes 100 of the two discs between which nozzle 108 is located. The relative motion between internal cogwheel 124 and external cogwheel 120 moves the nozzle head between the narrow end and the wide end of cassettes 100. The combined motion of external cogwheel 124 and internal cogwheel 120, provided that their angular velocities are different, thus causes the ends of nozzles 108 to make a spiral movement thus covering the whole area of the discs. This provides for even rinsing results or steady linear speed of the rinsing nozzles.

The cleansing liquid enters the filter and flows through pipe 110 into nozzles 108. The cleansing liquid then flows out with the dirt or other particles deposited on thread loops 208.

Figure 5:
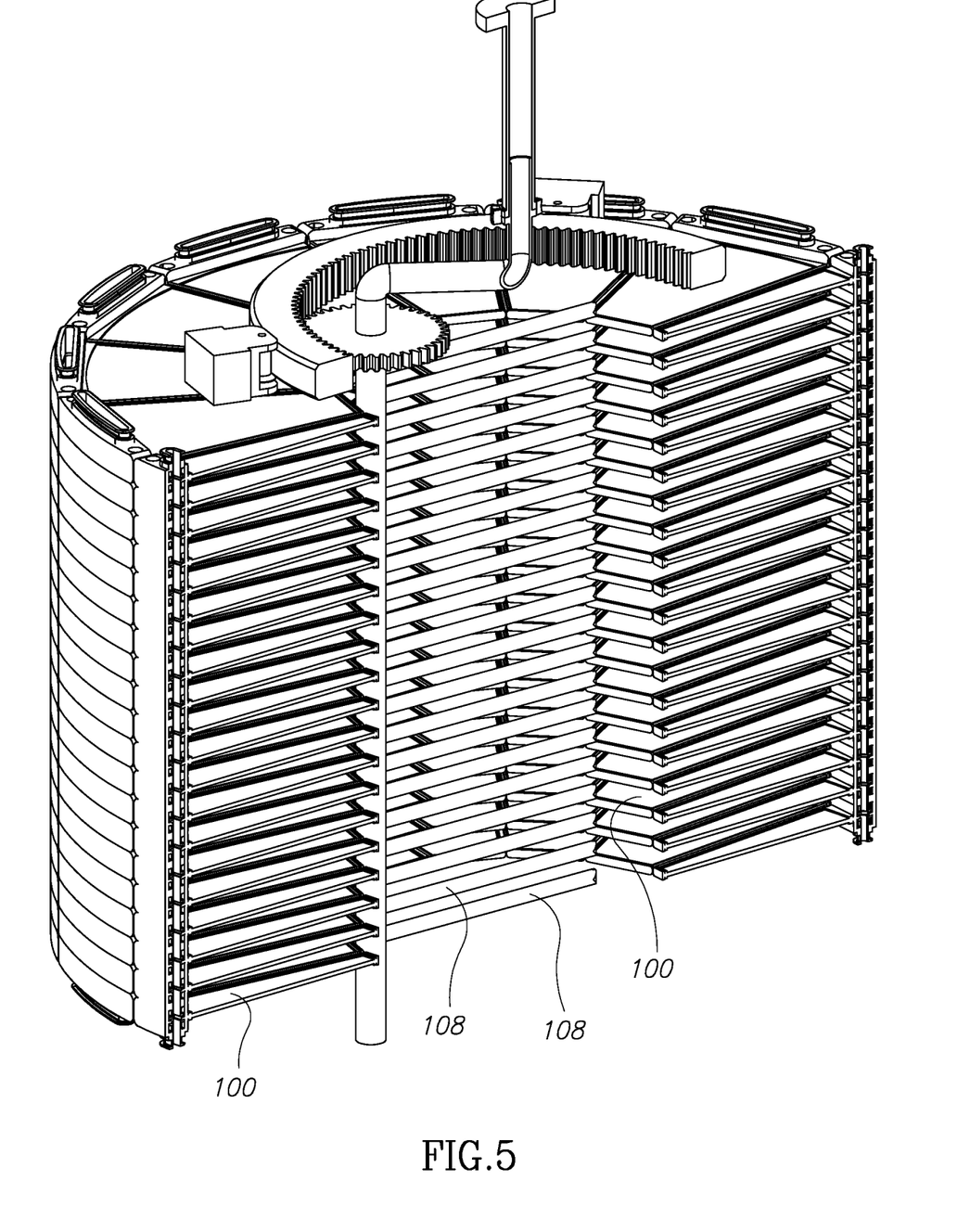
FIG. 5 is an illustration of a cross section of the filter, in accordance with some exemplary embodiments of the disclosed subject matter.

Referring now to FIG. 5, showing an illustration of a cross section of the filter, in accordance with some exemplary embodiments of the disclosed subject matter.

FIG. 5 shows a multiplicity of nozzles 108, each placed between two discs, such that each nozzle 108 sprays cleansing liquid over one side of each of two discs, excluding the two extreme nozzles which spray only one side of one disc.

It will be appreciated that internal cogwheel 124 and external cogwheel 120 can be placed internally or externally to the drum of the filter. If external cogwheel 124 and internal cogwheel 120 are external to the drum they will not be immersed in water. Such arrangement thus enables for a larger variety of materials from which the cogwheels and their connecting shafts can be made.

Figure 6:
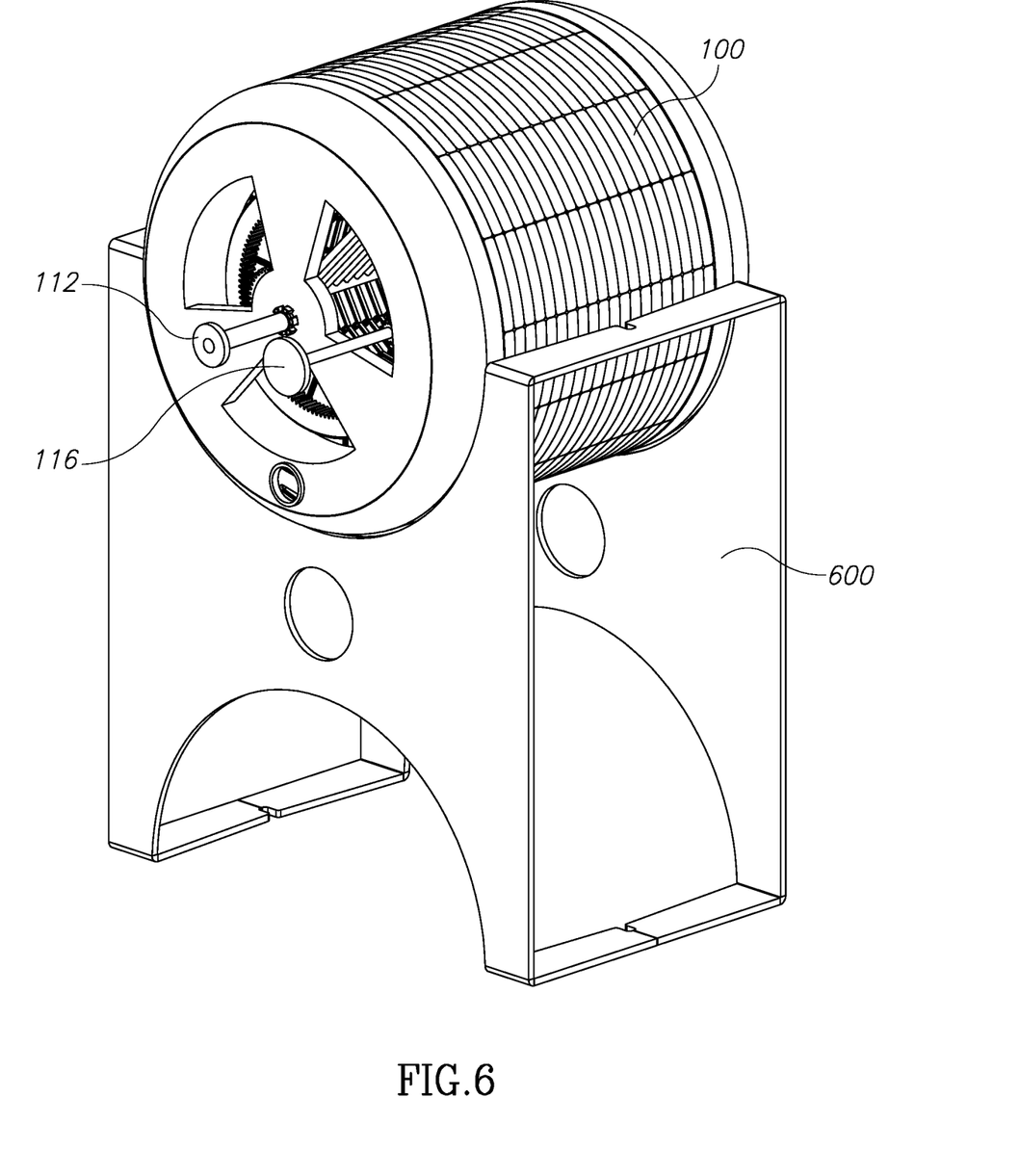
FIG. 6 is an illustration of the discs of a filter and platform thereof, in accordance with some exemplary embodiments of the disclosed subject matter.

Referring now to FIG. 6, showing an illustration of the discs of a filter and platform thereof in accordance with some exemplary embodiments of the disclosed subject matter.

The system comprises a drum-like cylindrical housing, comprising, and a cylindrical cover (not shown) covering cassettes 100, wherein each set of cassettes 100 form a disc.

As shown in FIG. 6, the discs can be positioned in a vertical position within the system.

In some embodiments, motors 112 and 116 can be located externally to the filter, and the filter can be placed on platform 600.

Figure 7:
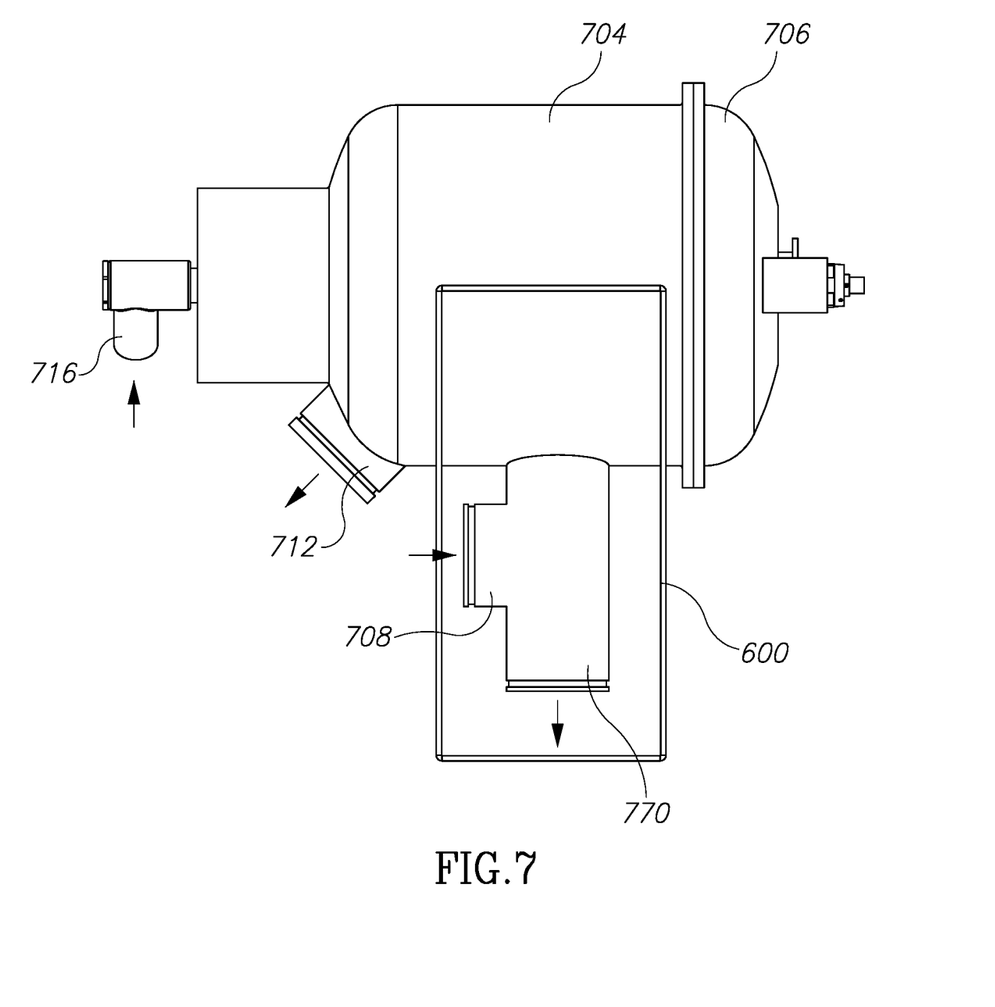
FIG. 7 is an illustration of an external view of the filter, in accordance with some exemplary embodiments of the disclosed subject matter.

Referring now to FIG. 7, showing the inlets and outlets of the filter of the filtering system, in accordance with some embodiments of the disclosure. The filtering system is within the disc having main cover 704 and side cover 706. The liquid to be filtered may enter the filtering system through pipe 708 and the filtered liquid can come out through pipe 712. The water or another rinsing liquid can enter the filtering system at high pressure through pipe 716 and come out through pipe 770.

Reference is now made to FIGS. 8A-8E, which illustrate an alternative rinsing mechanism. Except for this different rinsing mechanism, other members of the filter may be the same as discussed above. In this rinsing mechanism, as opposed to the one discussed above, there are two manifolds instead of one.

Figure 8A:
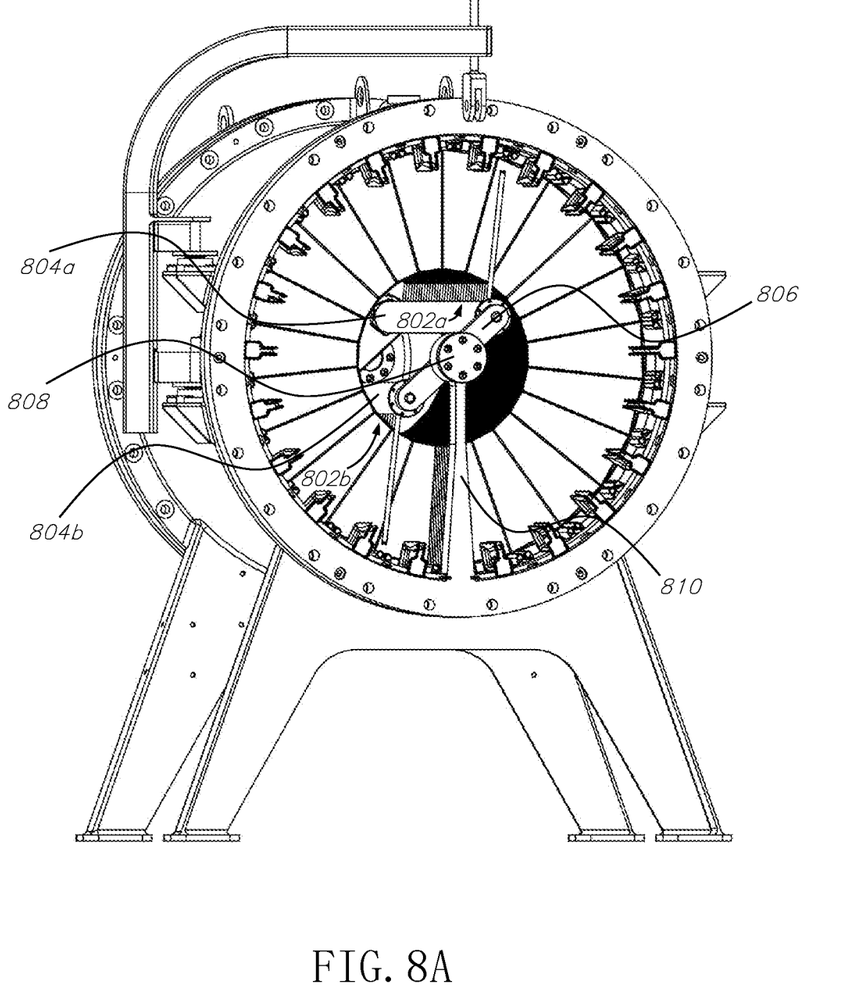
FIGS. 8A-8E are illustrations of internal members of a filter, in accordance with some exemplary embodiments of the disclosed subject matter.
Figure 8B:
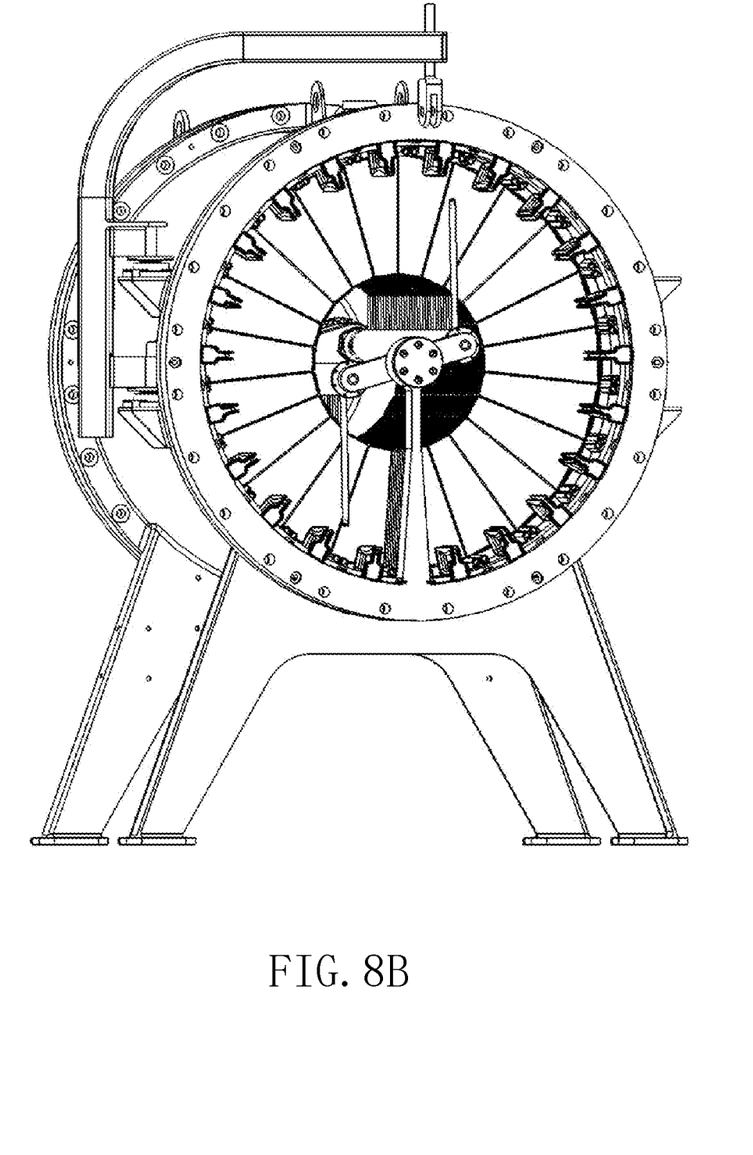
Figure 8C:
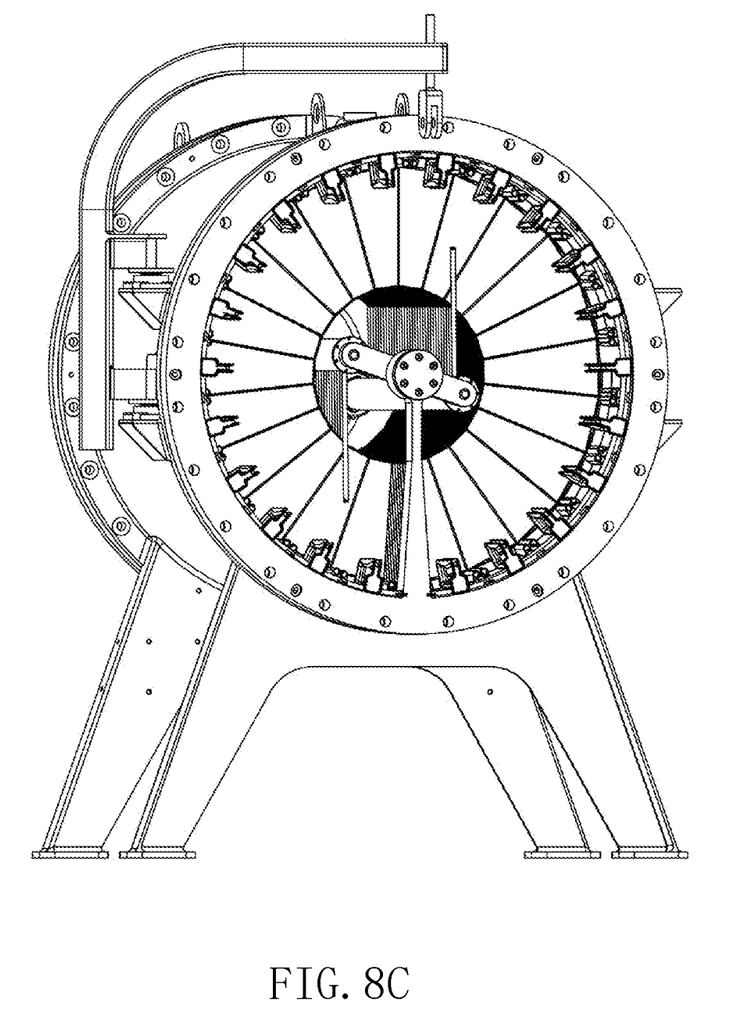
Figure 8D:
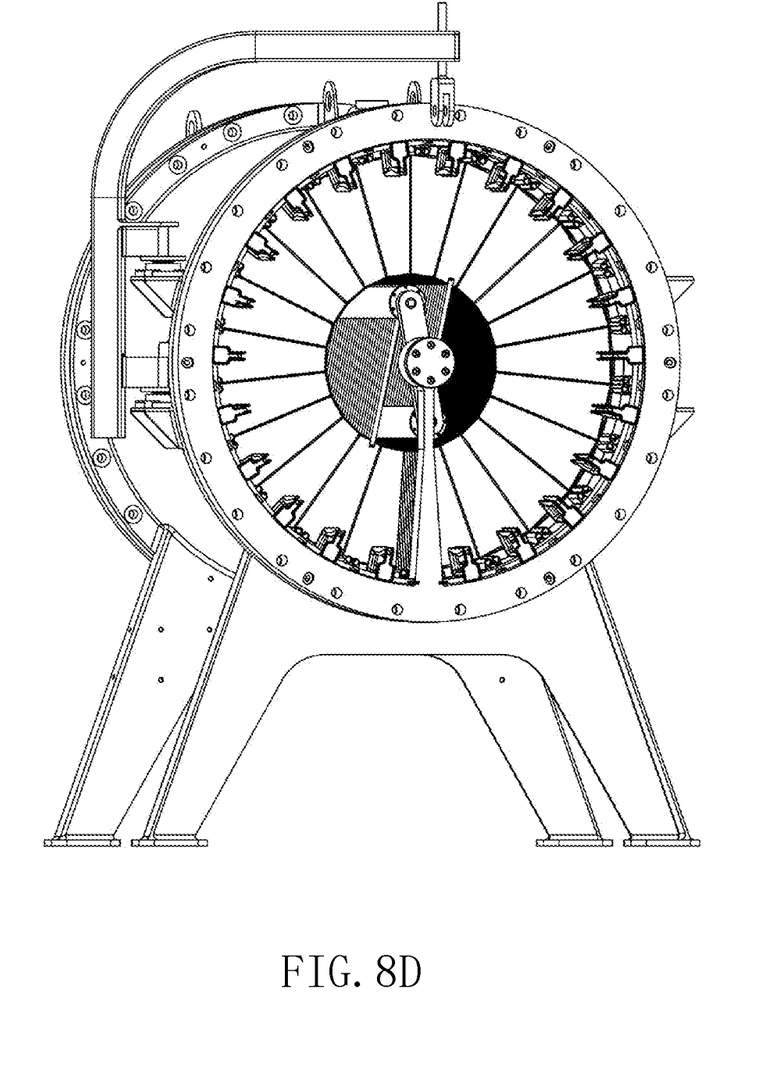
Figure 8E:
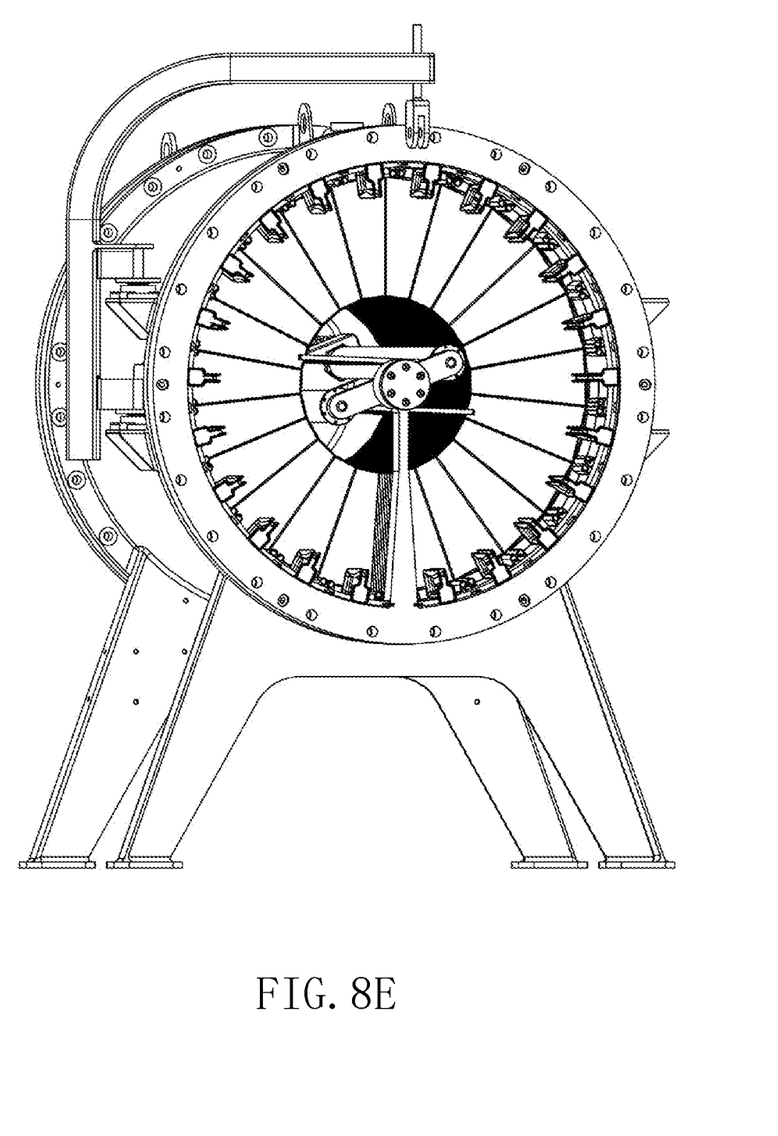

With specific reference to FIG. 8A, a first manifold includes a first set of nozzles 802a connected to a first common pipe 804a, and a second manifold includes a second set of nozzles 802b connected to a second common pipe 804b. Note that, in FIGS. 8A-8E, all but the most proximal nozzle are partly hidden in between the cassettes. Pipes 804a-b may be connected at their proximal ends to a joint mount 806, which, in turn, is connected through a pivot 808 to a chassis or a frame of the filter (for example via a connecting structure 810). At their distal end, pipes 804a-b may be connected to a mechanism (not fully visible) configured to jointly rotate them about a central axis of the filter (in the space between the radially-arranged cassettes), and to, separately, rotate each of them individually around its own axis. Each of FIGS. 8A-8E illustrates the two manifolds at a different posture, with the 804a-b at different stages of rotation about the central axis of the filter and around their own axis, such that nozzles 802a-b have their apertures (not shown) in front of differing points over the cassettes.

The use of two manifolds may enhance the efficacy of the rinsing action of the filter, and/or expedite the rinsing of the filter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where are inconsistencies between this application and any document incorporated by reference, it is hereby intended that the present application controls.

What is claimed is:

1. A filter for filtering a liquid comprising:
   a cylindrical housing; and
   a plurality of connected parallel discs extending within and along a length of the cylindrical housing, each of the plurality of connected parallel discs includes:
      a plurality of cassettes, wherein each cassette is shaped as a truncated sector having a wide end and a narrow end, the cassettes are arranged such that a perimeter of each disc is formed by the wide end of the cassettes, each cassette having a board with a plurality of supports thereon and an elongate opening extending orthogonally to a plane of said board adjacent to the wide end, wherein a filter material is wrapped around each cassette board and spaced from the cassette board by said supports thereby defining a filtrate space in fluid communication with each respective elongate opening through a hole in a sidewall of the cassette board adjacent the wide end;
   wherein elongate openings of each adjacent connected parallel disc cassette are connected such that perimeters of adjacent connected, parallel discs are aligned, and elongate openings of each respective adjacent connected parallel disc cassette are in fluid communication with each other, defining a filtrate outlet pipe extending along the length of said cylindrical housing;
   wherein a liquid to be filtered flows through the filter material into said filtrate space as a filtrate, while at least some particles are captured by said filter material, and wherein said filtrate then flows through the filtrate space over the board, through said hole, and into said filtrate outlet pipe.

2. The filter of claim 1, wherein the plurality of connected parallel discs remain static during filtration of the liquid and during rinsing of the filter.

3. The filter of claim 1, wherein the filter material comprises a thread wrapped in loops around the board.

4. The filter of claim 3, wherein the thread that is wrapped around the board is configured such that particles to be filtered out are caught between the loops of the wrapped thread.

5. The filter of claim 1, further comprising a rinsing system comprising a first set of multiplicity of nozzles connected to a first common pipe, each nozzle of the first set located between two adjacent discs of the plurality of connected parallel discs.

6. The filter of claim 5, wherein an end of each of the multiplicity of nozzles is movable over substantially an entire area of the two adjacent discs.

7. The filter of claim 5, wherein the first common pipe is movable by a planetary gear.

8. The filter of claim 5, wherein the end of each of the multiplicity of nozzles is rotatable in spiral motion over the two adjacent discs.

9. The filter of claim 8, wherein the spiral motion is created by two motors.

10. The filter of claim 9, wherein the two motors have different rotation speeds.

11. The filter of claim 8, wherein the spiral motion is created by two cogwheels rotated at different angular velocities.

12. The filter of claim 5, wherein the first set of multiplicity of nozzles are movable by a mechanism external to the cylindrical housing.

13. The filter of claim 5, wherein the rinsing system further comprises a second set of multiplicity of nozzles connected to a second common pipe, each nozzle of the second set located between two adjacent discs of the plurality of connected parallel discs.

* * * * *